US008345300B2

(12) United States Patent
Ishigaki (10) Patent No.: US 8,345,300 B2
(45) Date of Patent: Jan. 1, 2013

(54) COMPUTER READABLE MEDIUM, DOCUMENT PROCESSING APPARATUS, DOCUMENT PROCESSING SYSTEM, AND DOCUMENT PROCESSING METHOD FOR MANAGING ELECTRONIC DOCUMENTS

(75) Inventor: Toru Ishigaki, Kawasaki (JP)

(73) Assignee: Fuji Xerox Co., Ltd., Tokyo (JP)

( * ) Notice: Subject to any disclaimer, the term of this patent is extended or adjusted under 35 U.S.C. 154(b) by 1322 days.

(21) Appl. No.: 11/848,723

(22) Filed: Aug. 31, 2007

(65) Prior Publication Data

US 2008/0209549 A1 Aug. 28, 2008

(30) Foreign Application Priority Data

Feb. 27, 2007 (JP) ................................. 2007-047365

(51) Int. Cl.
*G06K 15/00* (2006.01)
*G06F 3/12* (2006.01)
*H04N 1/60* (2006.01)
*H04N 1/40* (2006.01)
*G04K 9/32* (2006.01)

(52) U.S. Cl. .................... 358/1.18; 358/3.28; 358/1.12; 358/1.15; 358/1.9; 382/298; 382/299

(58) Field of Classification Search ........................ None
See application file for complete search history.

(56) References Cited

U.S. PATENT DOCUMENTS

| | | | | |
|---|---|---|---|---|
| 7,039,214 B2* | 5/2006 | Miller et al. | .................. | 382/100 |
| 7,161,695 B2* | 1/2007 | Ueda et al. | .................. | 358/1.15 |
| 7,573,594 B2* | 8/2009 | Leslie et al. | .................. | 358/1.15 |
| 7,755,566 B2* | 7/2010 | Hoisko | .......................... | 345/1.2 |
| 8,125,660 B2* | 2/2012 | Grams | ............................. | 358/1.13 |
| 2002/0060802 A1* | 5/2002 | Hino | .............................. | 358/1.13 |
| 2002/0131081 A1* | 9/2002 | Laverty et al. | ............... | 358/1.15 |
| 2002/0186409 A1* | 12/2002 | Laverty et al. | ............... | 358/1.15 |
| 2003/0142361 A1* | 7/2003 | Walton | ......................... | 358/3.28 |
| 2005/0068586 A1* | 3/2005 | Sano | .............................. | 358/2.1 |
| 2005/0105116 A1* | 5/2005 | Kobashi | ....................... | 358/1.12 |
| 2005/0144116 A1* | 6/2005 | Jacoby, Jr. | ...................... | 705/37 |
| 2005/0219599 A1* | 10/2005 | White et al. | .................. | 358/1.14 |
| 2005/0219616 A1* | 10/2005 | Furuta et al. | .................. | 358/1.18 |

(Continued)

FOREIGN PATENT DOCUMENTS

CN 1744077 A 3/2006

(Continued)

OTHER PUBLICATIONS

Chinese Office Action issued in Application No. 2007-10162736.9, dated May 21, 2010.

(Continued)

*Primary Examiner* — Hilina S Kassa
(74) *Attorney, Agent, or Firm* — Sughrue Mion, PLLC (57) ABSTRACT

A computer readable medium storing a program causing a computer to execute a process for document processing, the process includes: receiving image data obtained by, with an image reading apparatus, reading a document of a predetermined format in which contents of an electronic document stored in a storage portion while being associated with identification information, the identification information, and an entry for additional information are arranged; extracting entered additional information from the entry area of the received image data; and correlating the extracted additional information with an electronic document associated with the identification information.

27 Claims, 8 Drawing Sheets

U.S. PATENT DOCUMENTS

| | | | |
|---|---|---|---|
| 2006/0044619 A1* | 3/2006 | Namiki et al. | 358/3.28 |
| 2006/0164693 A1* | 7/2006 | Matsumoto et al. | 358/3.28 |
| 2006/0212807 A1* | 9/2006 | Narusawa | 715/526 |
| 2007/0195370 A1* | 8/2007 | Suga et al. | 358/1.18 |

FOREIGN PATENT DOCUMENTS

| | | |
|---|---|---|
| JP | 2000-222394 A | 8/2000 |
| JP | 2001-005805 A | 1/2001 |
| JP | 2002-318799 A | 10/2002 |
| JP | 2004-246500 A | 9/2004 |
| JP | 2006-146606 A | 6/2006 |

OTHER PUBLICATIONS

English-language translation of Japanese Notification of Reason for Refusal, issued by the Japanese Patent Office in counterpart Japanese Application No. 2007-047365 on Jul. 10, 2012.

* cited by examiner

COMPUTER READABLE MEDIUM, DOCUMENT PROCESSING APPARATUS, DOCUMENT PROCESSING SYSTEM, AND DOCUMENT PROCESSING METHOD FOR MANAGING ELECTRONIC DOCUMENTS

CROSS-REFERENCE TO RELATED APPLICATIONS

This application is based on and claims priority under 35 USC 119 from Japanese Patent Application No. 2007-47365 filed on Feb. 27, 2007.

BACKGROUND

1. Technical Field

The present invention relates to a computer readable medium storing a program causing a computer to execute a process for document processing, a document processing apparatus, a document processing system, a document processing method, and a computer data signal embodied in a carrier wave for enabling a computer to perform a process for document processing.

2. Related Art

Recently, a document management apparatus in which a document formed on a sheet is read by a scanner or the like, and then stored and managed as an electronic document has been put to practical use.

SUMMARY

According to an aspect of the invention, there is provided A computer readable medium storing a program causing a computer to execute a process for document processing, the process including: receiving image data obtained by, with an image reading apparatus, reading a document of a predetermined format in which contents of an electronic document stored in a storage portion while being associated with identification information, the identification information, and an entry for additional information are arranged; extracting entered additional information from the entry area of the received image data; and correlating the extracted additional information with an electronic document associated with the identification information.

BRIEF DESCRIPTION OF THE DRAWINGS

Exemplary embodiments of the present invention will be described in detail based on the following figures, wherein:

FIG. 8 is a diagram showing a configuration example of a system in which an electronic document and additional information are shared, wherein 10 denotes image data receiving portion, 12 denotes information extracting portion, 14 denotes correlating portion, 16 denotes output controlling portion, 18 denotes display controlling portion, 20 denotes storage portion, 22 denotes scanner, 24 denotes printing device, 26 denotes displaying device, 28 denotes authentication processing portion, 100 denotes document client, 200 denotes document server, 300 denotes communicating unit.

DETAILED DESCRIPTION

Hereinafter, the best mode (hereinafter, referred to embodiment) for carrying out the invention will be described with reference to the accompanying drawings.

Figure 1:
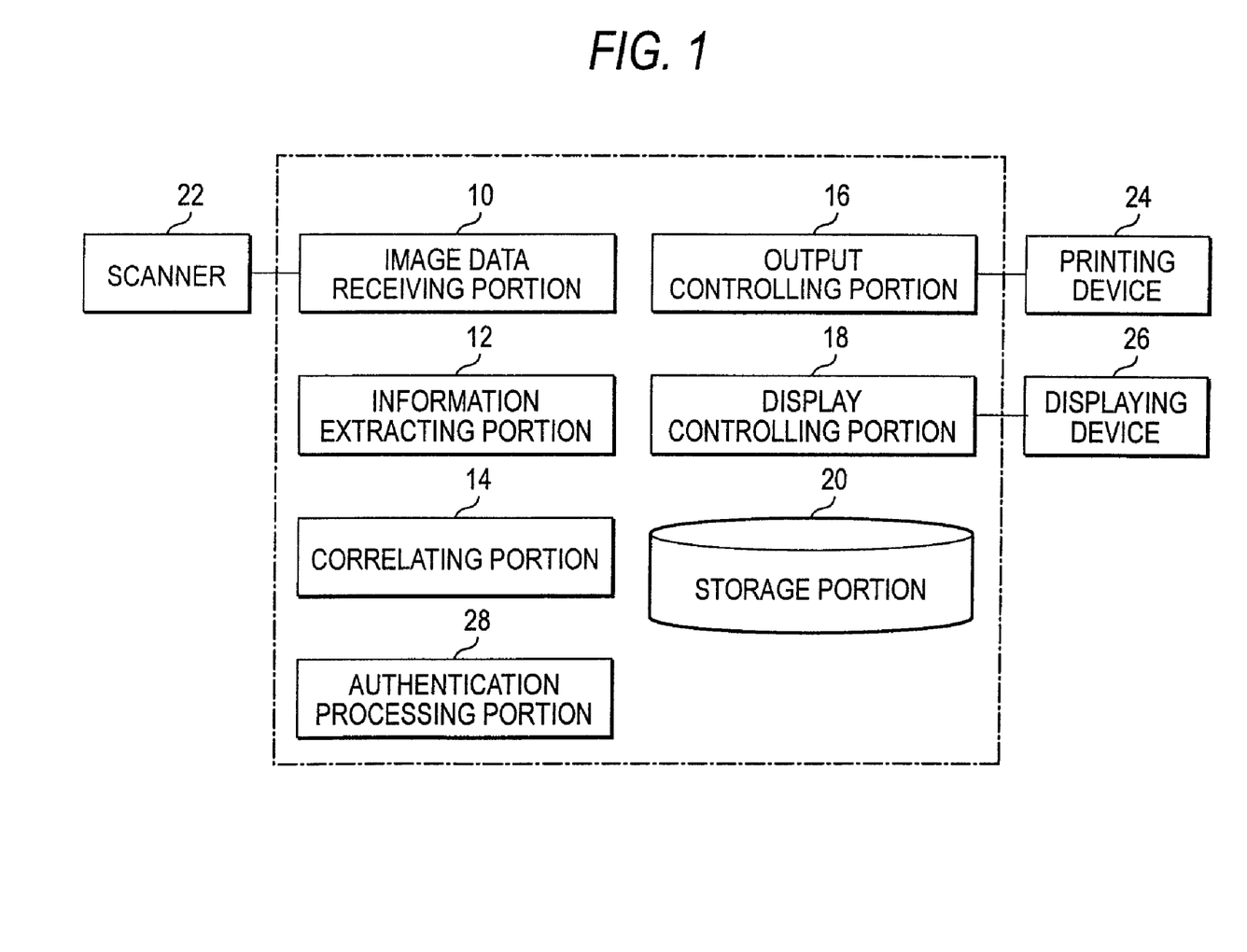
FIG. 1 is a functional block diagram of an embodiment of the document processing apparatus of the invention.

FIG. 1 is a functional block diagram of an embodiment of the document processing apparatus of the invention. Referring to FIG. 1, the document processing apparatus includes an image data receiving portion 10, an information extracting portion 12, a correlating portion 14, an output controlling portion 16, a display controlling portion 18, a storage portion 20, and an authentication processing portion 28.

The image data receiving portion 10 is realized, for example, by a central processor (a CPU or the like can be used) and programs for controlling processing operations of the CPU, and receives image data obtained by, with a scanner 22, reading a document of a predetermined format in which contents of an electronic document, identification information of the electronic document, and an entry area for additional information are arranged. The additional information is information which is added to the electronic document or other information, such as a comment or a note.

The invention can be implemented without using identification information of an electronic document. This will be described later in detail.

The information extracting portion 12 is realized, for example, by the CPU and programs for controlling processing operations of the CPU, and extracts additional information and identification information from the image data received by the image data receiving portion 10.

The correlating portion 14 is realized, for example, by the CPU and programs for controlling processing operations of the CPU, and correlates the additional information extracted by the information extracting portion 12 with an electronic document associated with the identification information extracted by the information extracting portion 12. The correlating portion 14 performs also a process of, based on positional relationships between the contents of the electronic document placed in the document of the predetermined format and the additional information, displaying the additional information together with the contents of the electronic document on a displaying device 26.

The output controlling portion 16 is realized, for example, by the CPU and programs for controlling processing operations of the CPU, and outputs image data for printing out a document of a predetermined format in which contents of an electronic document, identification information of the electronic document, and an entry area for additional information are arranged, from a printing device 24.

The display controlling portion 18 is realized, for example, by the CPU and programs for controlling processing operations of the CPU, and controls an operation of displaying the contents of the electronic document and the additional information on the displaying device 26, while arranging them in a predetermined format. The displaying device 26 can be configured, for example, by a liquid crystal display device, or a touch panel.

The storage portion 20 is realized, for example, by a random access memory (RAM) which is used as a working memory for the CPU, a read-only memory (ROM), a magnetic storage device such as a hard disk drive, or another storage device which is readable by a computer. The storage portion stores: programs for controlling processing operations of the CPU; an electronic document; identification information of the electronic document; additional information; layout information of a document of a predetermined format in which the contents of the electronic document, the identification information of the electronic document, and the entry area for the additional information are arranged; etc. The electronic document is configured by document data which are produced by an adequate application program or the like, or those which are read by the scanner 22. The document data may have arbitrary contents, and, for example, may be characters, drawings, images, their combinations, or the like.

The authentication processing portion 28 is realized, for example, by the CPU and programs for controlling processing operations of the CPU, and performs a process of authenticating and identifying the user who causes the scanner 22 to read a document of the predetermined format. The authentication processing portion 28 is required in the case where an electronic document is to be identified without using the identification information. In the case where an electronic document is identified by identification information, the authentication processing portion is not necessary.

For example, a document processing system is configured by the document processing apparatus, the scanner 22, the printing device 24, and the displaying device 26.

The configuration of a part of the document processing apparatus shown in FIG. 1 may be configured by a dedicated hardware (for example, an ASIC). The apparatus may have a form in which a part of the configuration is arranged in an external system, and the external configuration is connected by a communicating unit (for example, a communication line). Furthermore, plural document processing apparatuses are connected to one another so that they operate cooperatively with each other.

Figure 2:
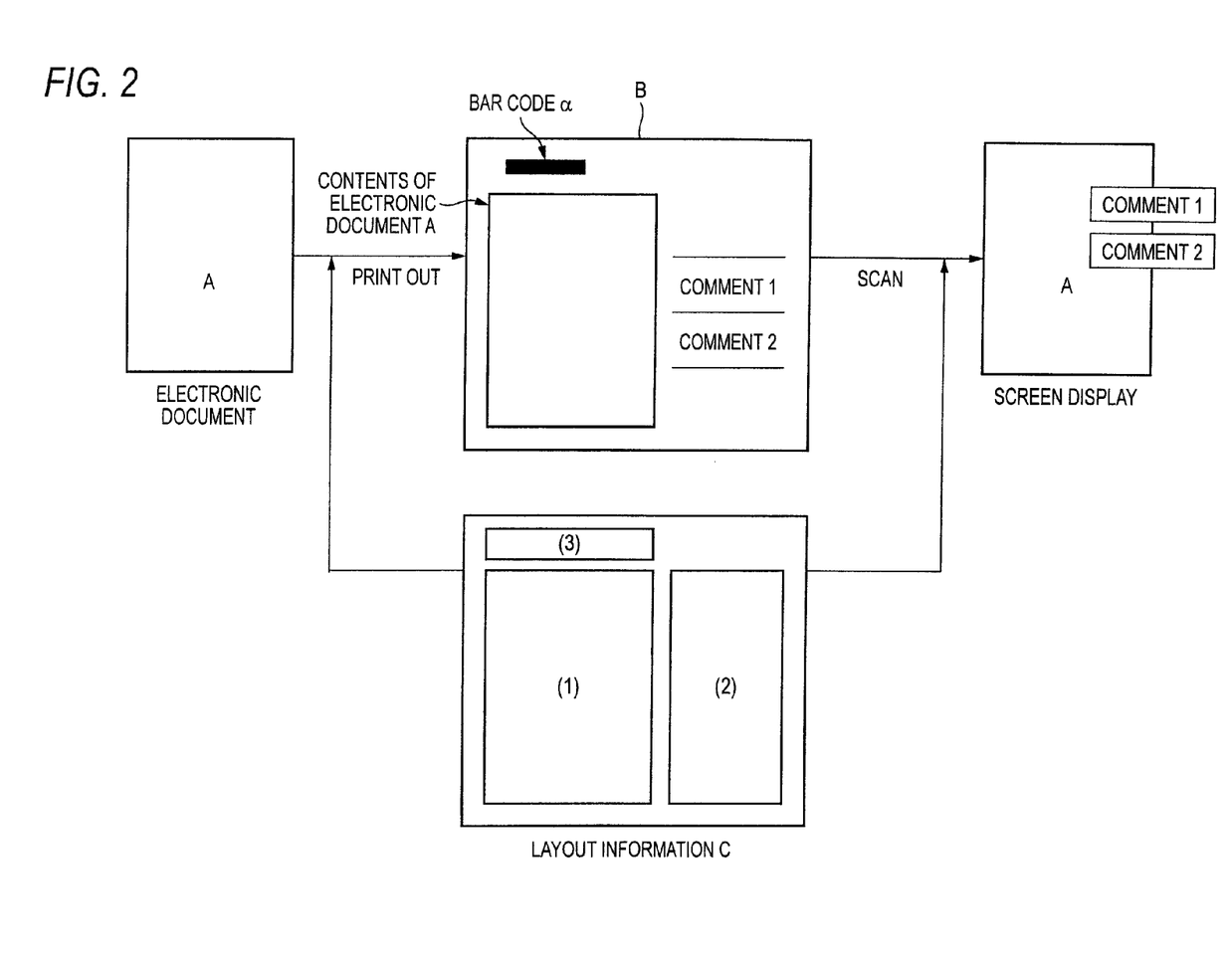
FIG. 2 is a diagram showing an example of the procedure of processing an electronic document and additional information.

FIG. 2 is a diagram showing an example of the procedure of processing an electronic document and additional information. Referring to FIG. 2, the output controlling portion 16 controls an electronic document A stored in the storage portion 20 to be printed out by the printing device 24 as a document B of a predetermined format in which the contents of the electronic document, identification information of the electronic document, and an entry area for additional information are arranged in accordance with predetermined layout information C. The layout information C is stored in the storage portion 20. As the layout information, information which is selected by the user, or that which is set by default is used by the output controlling portion 16. Alternatively, a configuration in which, when the document B is printed out, the output controlling portion 16 newly produces layout information may be employed. In the layout information C of FIG. 2, a position (1) where the contents of the electronic document are placed, a position (2) where the entry are for the additional information is placed, and a position (3) where the identification information is placed are set.

In the example shown in FIG. 2, as the document B of a predetermined format, a bar code α indicating the identification information of the electronic document A is placed in a region above the contents of the electronic document A, and the entry are for the additional information is placed in a region on the right side of the contents of the electronic document A. The form indicating the identification information of the electronic document A is not restricted to the bar code α. Any form may be employed as far as it can identify the electronic document A. Preferably, the identification information contains page information for identifying pages of the electronic document A. In the case where the identification information contains page information, the additional information can be correlated in the unit of page. Information (for example, a bar code) indicating the identification information of the electronic document A, and that indicating the page information may be separately placed. In the entry area for the additional information, the user can enter desired information for the electronic document A, as additional information by means of handwriting, printing by a predetermined printing device, imprint by a stamp, or the like.

The user enters desired information (in FIG. 2, Comments 1 and 2) as the additional information into the document B, and thereafter the document B is read by the scanner 22. The image data receiving portion 10 receives image data of the document B read by the scanner 22, and delivers the data to the information extracting portion 12. The information extracting portion 12 refers the layout information C, and extracts the entered additional information and bar code which exist at predetermined positions of the image data. For example, the extraction of the entered additional information may be performed in the following manner. The read image data of the document B are binarized. Existence of entered additional information is determined on the basis of, for example, the amount of black pixels in the entry area for additional information. If the amount of black pixels exceeds a given threshold, it is determined that additional information exists, and the additional information is segmented from the entry area for additional information. Alternatively, additional information which has been entered by using an ink of a specific color or a special ink may be segmented. The segmented additional information may be converted to character data by an OCR (Optical Character Reader), a handwritten character recognizer, or the like. In this way, in the example shown in FIG. 2, Comments 1 and 2 are extracted as additional information. Although, in FIG. 2, two comments (Comments 1 and 2) are added to the electronic document A, the number of sets of additional information is arbitrary, and not restricted to two.

The correlating portion 14 reads out an electronic document associated with the bar code from the storage portion 20, and correlates the electronic document with the extracted additional information. As shown in FIG. 2, the electronic document A, and Comments 1 and 2 which are correlated in this way are displayed on the displaying device 26 by the display controlling portion 18. In this case, the display positions of Comments 1 and 2 are determined by the correlating portion 14 on the basis of positional relationships in the document B among the contents of the electronic document A and Comments 1 and 2. Namely, from the positional relationships among the contents of the electronic document A and Comments 1 and 2 in the vertical direction of FIG. 2, the positions in the display on the displaying device 26 are determined.

Figure 3A:
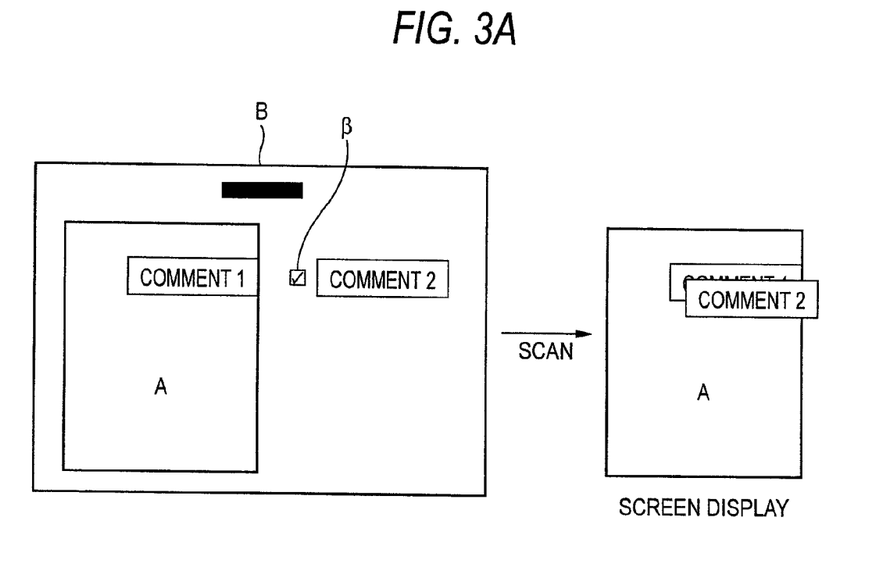
FIGS. 3A and 3B are diagrams showing another example of the procedure of processing an electronic document and additional information.

FIGS. 3A and 3B are diagrams showing other examples of the procedure of processing an electronic document and additional information. In FIG. 3A, an example is shown in which the output controlling portion 16 prints out from the printing device 24 the electronic document A containing Comments 1 as additional information, and enters a replay to Comment 1 into the entry area for additional information, as Comment 2 in order to set it as additional information for Comment 1. In this case, the fact that Comment 2 is additional information for Comment 1 can be indicated by, for example, an operation that the user checks a check box β. For example, the check box β is prepared for each of sets of additional information which are previously added to the electronic document, and combined with a bar code or the like indicating the identification information of the electronic document, thereby enabling the correlating portion 14 to easily determine to which electronic document and to which comment the additional information indicated by Comment 2 is directed. Alternatively, the check box β may not be printed on the document B, but it may be determined whether Comment 2 is additional information for Comment 1 or not, based on the positional relationships between Comments 1 and 2. For example, a method is enabled in which, when the positions of Comments 1 and 2 in the vertical direction of FIG. 3A coincide with each other, it is determined that Comment 2 is additional information for Comment 1.

As described above, after Comment 2 is entered into the document B, the document is read by the scanner 22, and the display controlling portion 18 displays the document on the displaying device 26. In this case, preferably, the display is performed so as to indicate that Comment 2 is additional information for Comment 1, by, for example, displaying Comment 2 to be superimposed on Comment 1. Preferably, the additional information which is superimposedly displayed is caused to be displayed at the uppermost position by an area designating operation performed by a pointing device such as a mouse, so that the user can read its contents on the screen.

Figure 3B:
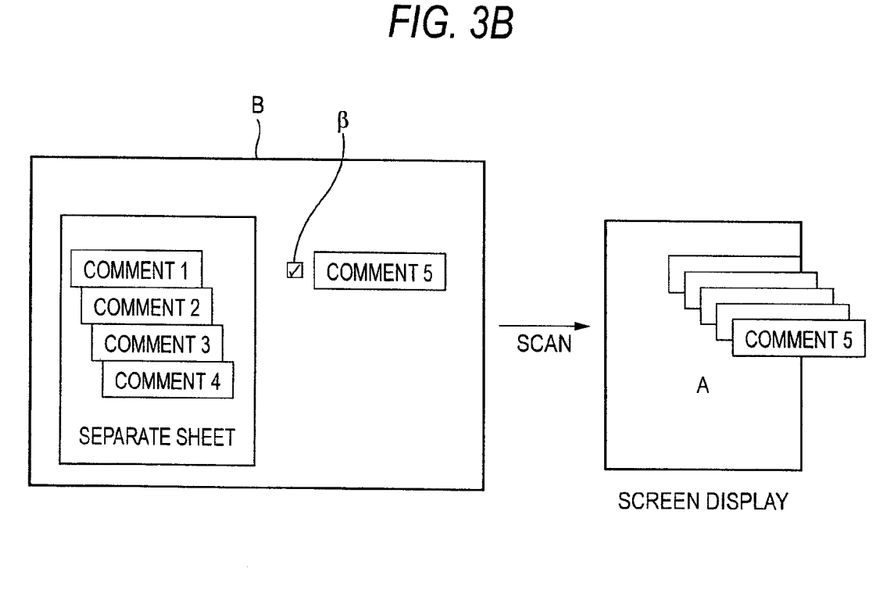

Furthermore, FIG. 3B shows an example in the case where there are many sets of additional information for additional information (in FIG. 3B, Comments 1 to 4 or four in total). In this case, the comments are printed out on a separate sheet different from that on which the contents of the electronic document A are printed. At this time, in place of the electronic document A, the document B in which the separate sheet is placed is printed out. In the same manner as the case of FIG. 3A, the user enters Comment 5 for Comments 1 to 4 into the entry area for additional information, checks the check box β, and then causes the document to be read by the scanner 22. The display controlling portion 18 displays the electronic document A to which all Comments 1 to 5 are added, on the displaying device 26. In place of the use of the check box β, a configuration may be employed in which a comment (Comment 5) written on the document B in which a separate sheet is placed is determined to be additional information for a comment (Comments 1 to 4) written on the separate sheet. Preferably, the document B including the separate sheet may have identification information which is different from that of the document B including the electronic document A.

For example, page numbers are set in the document B including the electronic document A, and the document B including the separate sheet, and the documents are distinguished from each other based on the page numbers. The contents of the separate sheet may be configured by a blank, the contents of the electronic document A, a description indicating a separate sheet of the electronic document A, or the like.

Figure 4:
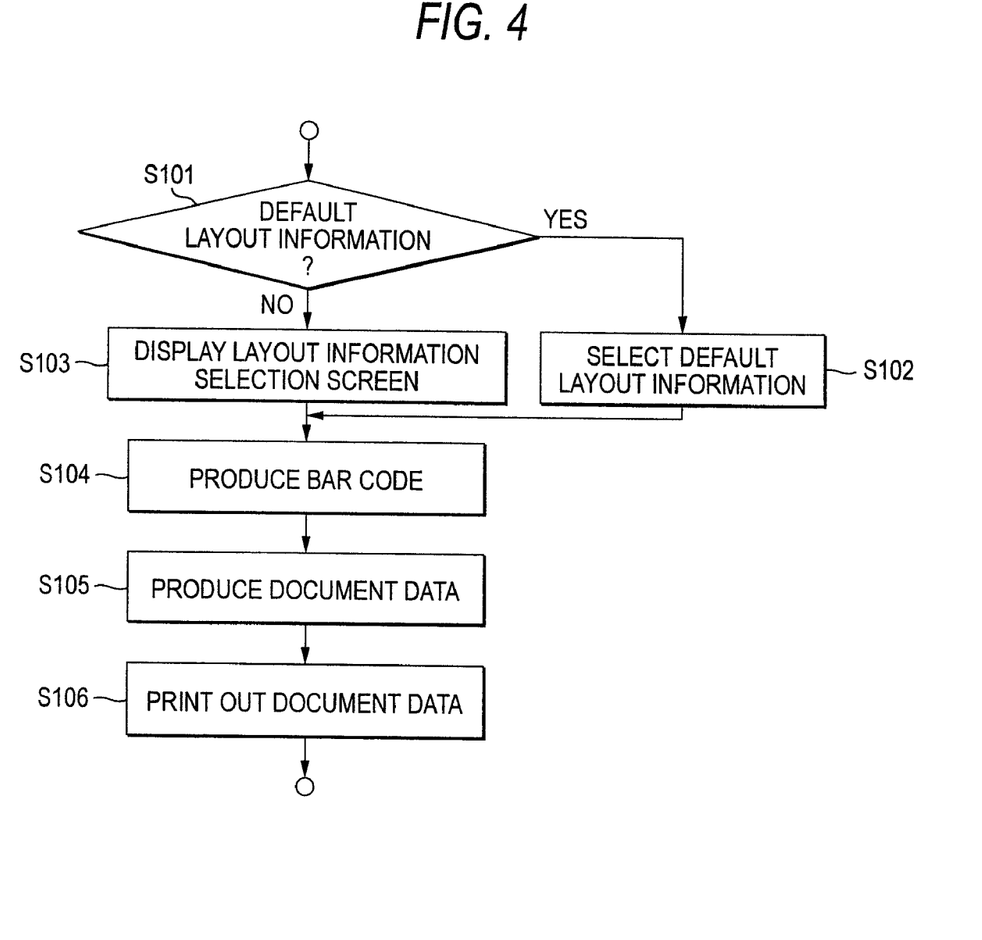
FIG. 4 is a flowchart of an operation example of the document processing system of the invention.

FIG. 4 shows the flow of an operation example of the document processing system of the embodiment. In the example of FIG. 4, the user selects a desired one of electronic documents stored in the storage portion 20 in a personal computer or the like, and instructs "Review on paper document", whereby the process is started.

Referring to FIG. 4, in order to allow the output controlling portion 16 to produce image data of a document of a predetermined format in which the contents of the electronic document, identification information of the electronic document, and an entry area for additional information are arranged, it is determined whether the used layout information is set by default or not (S101). The user previously designates whether the default layout information is to be used or not.

In the case where the default layout information is to be used, the output controlling portion 16 reads out the default layout information from the storage portion 20 (S102). In the case where the default layout information is not to be used, the display controlling portion 18 displays a list of layout information stored in the storage portion 20 as a layout information selection screen, on the displaying device 26 (S103). The user selects desired layout information from the list displayed on the displaying device 26.

The correlating portion 14 produces identification information (such as a bar code) of the electronic document selected by the user (S104), and delivers it to the output controlling portion 16. The output controlling portion 16 produces image data of a document of a predetermined format in which the contents of the electronic document, the identification information of the electronic document, and the entry data for additional information are arranged, based on the layout information selected in S102 or S103 (S105), and controls the printing device 24 to print out the image data (S106).

Figure 5:
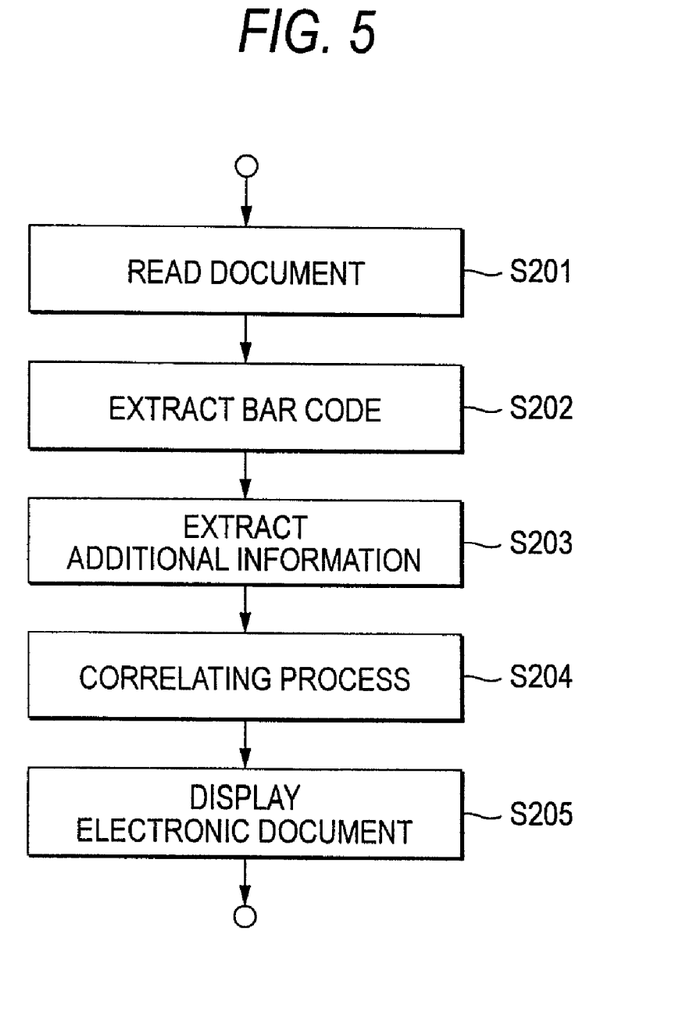
FIG. 5 is a flowchart of another operation example of the document processing system of the invention.

FIG. 5 shows the flow of another operation example of the document processing system of the embodiment. In the example of FIG. 5, the user enters a comment as additional information into the entry area for additional information of the document printed out in FIG. 4, and then causes the document to be read by the scanner 22.

Referring to FIG. 5, when the document on which the user enters a comment is read by the scanner 22 (S201), the image data receiving portion 10 receives image data of the document, and delivers the data to the information extracting portion 12. The information extracting portion 12 extracts identification information (such as a bar code) from the image data (S202), and extracts additional information (such as a comment) (S203).

The correlating portion 14 reads out an electronic document corresponding to the identification information from the storage portion 20, and correlates the additional information with the electronic document (S204). In this case, when the identification information includes information for identifying pages of the electronic document, additional information can be correlated with each of pages of the electronic document. The display controlling portion 18 displays the electronic document correlated with additional information, on the displaying device 26 (S205).

Figure 6:
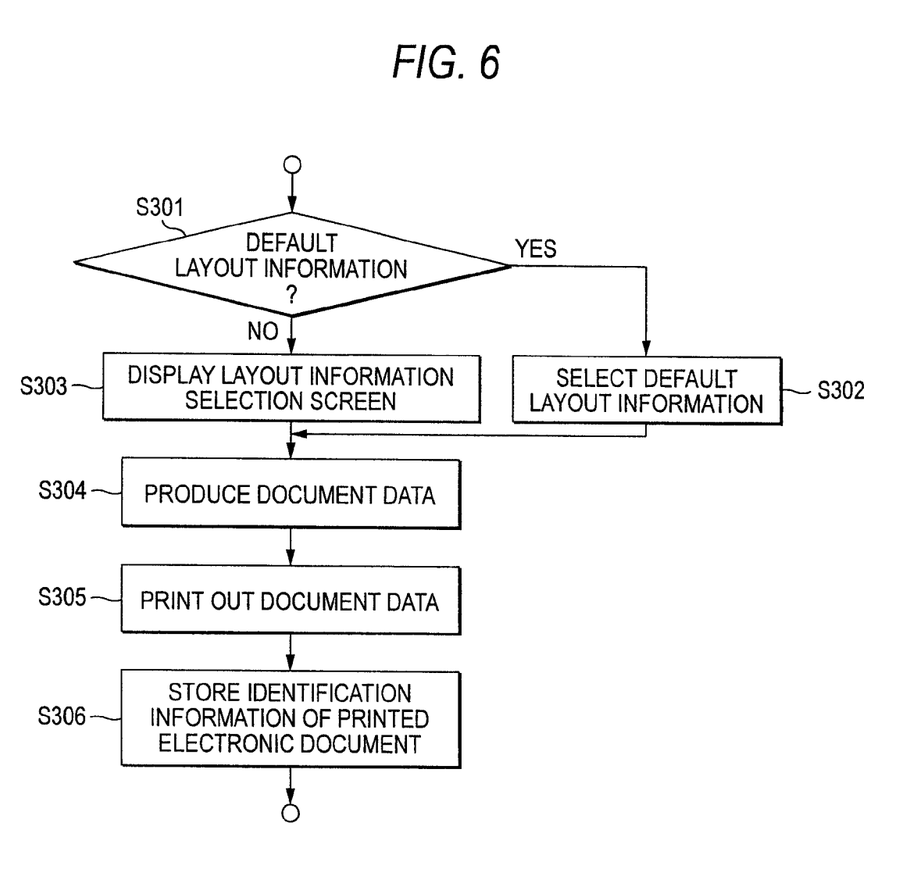
FIG. 6 is a flowchart of a further operation example of the document processing system of the invention.

FIG. 6 shows the flow of a further operation example of the document processing system of the embodiment. The examples of FIGS. 4 and 5 are configured so that an electronic document is identified by identification information such as a bar code. By contrast, in the operation example of FIG. 6, an electronic document to which additional information is added is identified without using identification information. Also in the example, the user selects a desired one of electronic documents stored in the storage portion 20 in a personal computer or the like, and instructs "Review on paper document", whereby the process is started.

Referring to FIG. 6, in order to allow the output controlling portion 16 to produce image data of a document of a predetermined format in which the contents of the electronic document, and an entry area for additional information are arranged, it is determined whether the used layout information is set by default or not (S301). The user previously designates whether the default layout information is to be used or not.

In the case where the default layout information is to be used, the output controlling portion 16 reads out the default layout information from the storage portion 20 (S302). In the case where the default layout information is not to be used, the display controlling portion 18 displays a list of layout information stored in the storage portion 20 as a layout information selection screen, on the displaying device 26 (S303). The user selects desired layout information from the list displayed on the displaying device 26.

The output controlling portion 16 produces image data of a document of a predetermined format in which the contents of the electronic document, and the entry area for additional information are arranged, based on the layout information selected in S302 or S303 (S304), and controls the printing device 24 to print out the image data (S305). The portion produces identification information for identifying the printed electronic document, and stores it into the storage portion 20 (S306). The identification information of the electronic document includes the information of the user who instructs "Review on paper document". Identification information of an electronic document is not particularly restricted, and may be realized by, for example, a method in which a predetermined flag is correlated with an electronic document.

Figure 7:
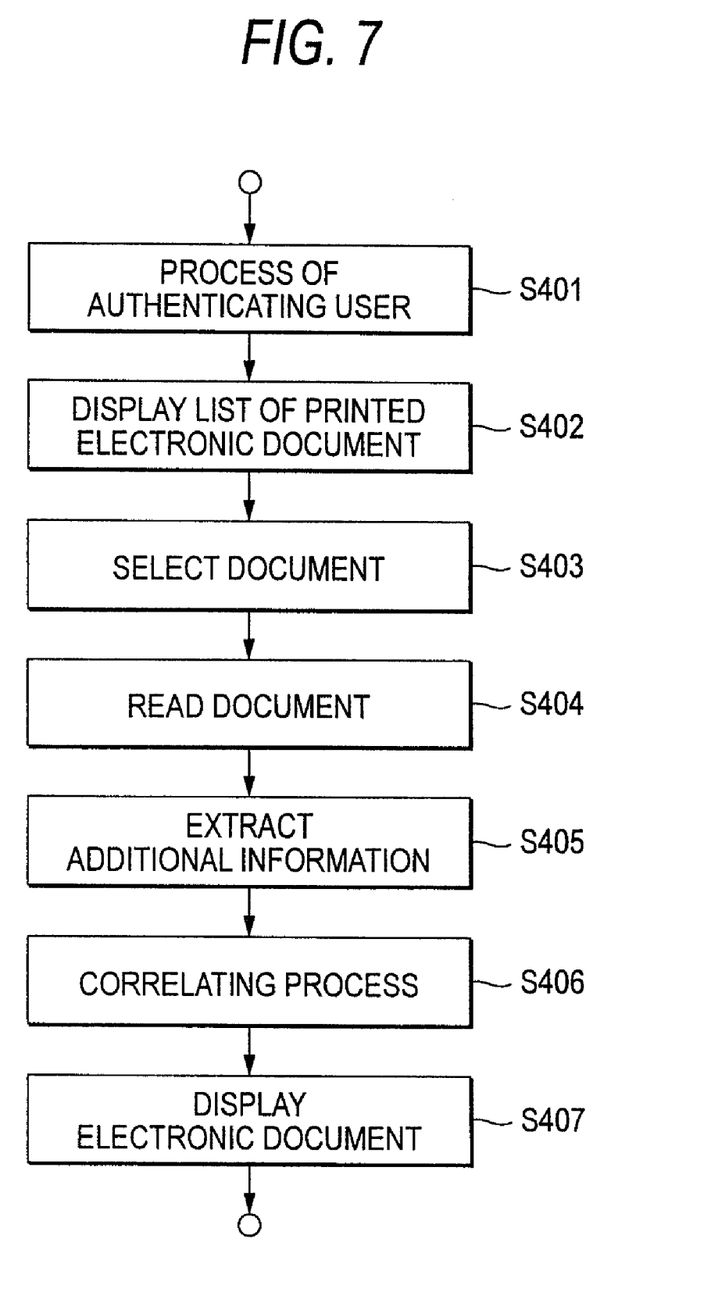
FIG. 7 is a flowchart of a still further operation example of the document processing system of the invention.

FIG. 7 shows the flow of a still further operation example of the document processing system of the embodiment. In the operation example of FIG. 7, the user enters a comment as additional information into the entry area for additional information of the document printed out in FIG. 6, and then causes the document to be read by the scanner 22.

Referring to FIG. 7, in order to identify the user who causes the scanner 22 to read a document, the authentication processing portion 28 performs a process of authenticating the user (s401). The authentication process is performed with using personal identification information, passwords, and the like which are previously registered. Then, the identification information which is produced in S306 in FIG. 6 is referred, the identified user instructs "Review on paper document", and a list of electronic documents which are printed out in S305 is displayed on the displaying device 26 by the display controlling portion 18 (S402). The user refers the list displayed on the displaying device 26, and selects an electronic document in which the contents are reviewed (s403). For example, this selection can be performed by a pointing device such as a mouse.

Next, a document in which the user enters additional information (such as a comment) is read by the scanner 22 (S404). The image data receiving portion 10 receives image data of the document read by the scanner 22, and delivers the data to the information extracting portion 12. The information extracting portion 12 extracts the additional information from the image data (S405).

The correlating portion 14 reads out the electronic document which is selected in S403 by the user, from the storage portion 20, and correlates the comment with the electronic document (S406). In this case, a configuration may be employed in which, when the user selects in S403 an electronic document, also a page of the electronic document can be designated. In the configuration, additional information can be correlated with each page of an electronic document. The display controlling portion 18 displays the electronic document with which additional information is correlated, on the displaying device 26 (S407).

The programs for implementing the above-described steps of FIGS. 4, 5, 6, and 7 can be stored on a recording medium. Alternatively, the programs can be provided by a communicating unit. In this case, for example, the above-described programs may be apprehended as an invention of "computer readable recording medium on which a program is recorded".

"Computer readable recording medium on which a program is recorded" means a recording medium which is used in install, execution, distribution, and the like of a program, in which a program is recorded, and which is readable by a computer.

For example, the recording medium may be: "DVD-R, DVD-RW, DVD-RAM, or the like" which is a digital versatile disk (DVD), and which complies with the standard defined by the DVD Forum; "DVD+R, DVD+RW, or the like" which complies with the standard defined by DVD+RW; a read-only memory (CD-ROM), CD-Recordable (CD-R), CD-Rewritable (CD-RW), or the like which is a compact disk (CD); a magnetooptical disk (MO); a flexible disk (FD); a magnetic tape; a hard disk; a read-only memory (ROM); an electrically erasable and rewritable read-only memory (EEPROM); a flush memory; or a random access memory (RAM).

The above-described programs, or a part of the programs can be recorded on such a recording medium to be subjected storage, distribution, and the like, or transmitted by communication through a transmission medium such as: a wired or wireless network used in a local are network (LAN), a metropolitan area network (MAN), a wide area network (WAN), an internet, an intranet, an extranet, or the like; a combination of such networks; or the like.

The programs may be transported while being superimposed on a carrier wave.

The programs may be a part of other programs, or recorded together with other program on a recording medium.

Alternatively, the programs may be separately recorded on plural recording media.

The above-described document processing system of the embodiment can be applied also to a use shared among plural users. In this case, an electronic document and additional information must be shared among the users.

Figure 8:
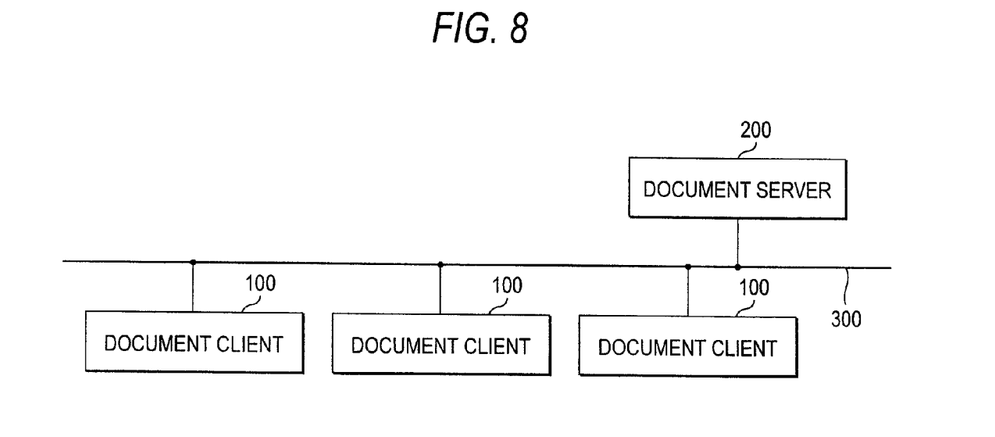

FIG. 8 shows a configuration example of such a system in which an electronic document and additional information are to be shared among plural users. In the example of FIG. 8, in order to allow plural users to share the document processing system, document clients 100 each including the portions shown in FIG. 1, i.e., the image data receiving portion 10, the output controlling portion 16, the display controlling portion 18, the scanner 22, the printing device 24, and the displaying device 26 are connected to a document server 200 through a communicating unit 300 such as a network. The document server 200 includes the information extracting portion 12, the correlating portion 14, and the storage portion 20. For example, computers may be used as the document clients 100 and the document server 200. Alternatively, copiers or composite machines (also called multi-functional machines, and having functions such as a scanner, a printer, a copier, and a facsimile apparatus) may be used as the document clients 100.

The storage portion 20 disposed in the document server 200 is configured so that plural users respectively enter additional information into the entry area, plural sets of additional information read by the scanners 22 are stored, and an electronic document and additional information can be shared among the document clients 100. According to the configuration, as shown in FIGS. 3A and 3B, additional information such as a comment can be further added to additional information which is added by another user. In this case, when each additional information contains identification information of the user, it is possible to obtain a configuration in which, when the display controlling portion 18 displays an electronic document on the displaying device 26, the user who entered the additional information can be identified.

The foregoing description of the embodiments of the present invention has been provided for the purposes of illustration and description. It is not intended to be exhaustive or to limit the invention to the precise forms disclosed. Obviously, many modifications and variations will be apparent to practitioners skilled in the art. The embodiments were chosen and described in order to best explain the principles of the invention and its practical applications, thereby enabling others skilled in the art to understand the invention for various embodiments and with the various modifications as are suited to the particular use contemplated. It is intended that the scope of the invention defined by the following claims and their equivalents.

What is claimed is:

1. A non-transitory computer readable medium storing a program causing a computer to execute a process for document processing, the process comprising:
   reading, with an image reading apparatus, a document to obtain image data;
   determining whether the obtained image data is in a first format, the first format specifying layout information of a position where an electronic document is placed, a position where identification information identifying the electronic document is placed, and a position where an entry area for additional information is placed, wherein the electronic document is stored in a storage portion and the electronic document is associated with the identification information identifying the electronic document;
   if it is determined that the obtained image data is in the first format, extracting, based on the position where the entry area is placed as specified by the layout information, entered additional information from the entry area of the obtained image data; and
   correlating the extracted additional information with the electronic document corresponding to the identification information associated with the electronic document, wherein the correlating determines a position of the additional information to be displayed together with the electronic document, based on positional relationships between the electronic document and the additional information entered in the entry area.

2. The non-transitory computer readable medium according to claim 1, wherein the identification information includes page information for identifying a page of the stored electronic document, and the correlating correlates the extracted additional information with the page of the stored electronic document based on the page information.

3. The non-transitory computer readable medium according to claim 1, wherein the process further comprises:
   outputting document data of a second format in which the electronic document, the identification information, the entered additional information overlapping the electronic document, and a new entry area for additional information are arranged, to a printing apparatus.

4. The non-transitory computer readable medium according to claim 3, wherein the reading comprises receiving, as contents of the electronic document, contents of an electronic document including correlated first additional information, and
   when determined that second additional information entered in the new entry area corresponds to the first additional information included in the contents of the electronic document, the correlating comprises correlating the second additional information with the first additional information.

5. The non-transitory computer readable medium of claim 1, wherein the layout information is stored in the storage portion.

6. The non-transitory computer readable medium of claim 1, wherein the additional information comprises information added to the electronic document after the electronic document is outputted from the storage portion, and the additional information is entered in the entry area by a user by handwriting, printing by a printing device, or imprinting by a stamp.

7. The non-transitory computer readable medium of claim 1, wherein the process further comprises:
   obtaining previously presented image data by reading, with the image reading apparatus, a document of a predetermined format in which the electronic document, the identification information, the additional information previously correlated with the electronic document, and another entry area for second additional information are arranged;
   extracting entered second additional information from the other entry area of the obtained previously presented image data; and
   determining whether to correlate the extracted second additional information with the additional information previously correlated with the electronic document.

8. The non-transitory computer readable medium of claim 7, wherein the determining whether to correlate the extracted second additional information with the additional information previously correlated with the electronic document comprises:
   determining whether a selection area in the document of the predetermined format is selected;
   correlating, in response to determining that the selection area is selected, the extracted second additional information with the additional information previously correlated with the electronic document and storing the correlated second additional information; and
   storing, in response to determining that the selection area is not selected, the extracted second additional information without correlating the second additional information with the additional information previously correlated with the electronic document.

9. The non-transitory computer readable medium of claim 1, wherein the process further comprises:
   displaying, on a display, the electronic document together with the entered additional information based on the correlating between the extracted additional information and the electronic document, wherein the entered additional information overlaps the electronic document and extends beyond a margin of the electronic document on the display.

10. A document processing apparatus comprising:
    an image data reading unit that reads a document to obtain image data;
    a determination unit that determines whether the obtained image data is in a first format, the first format specifying layout information of a position where an electronic document is placed, a position where identification information identifying the electronic document is placed, and a position where an entry area for additional information is placed, wherein the electronic document is stored in a document storing unit and the electronic document is associated with the identification information identifying the electronic document;

an information extracting unit that extracts, if it is determined that the obtained image data is in the first format, entered additional information from the entry area of the obtained image data based on the position where the entry area is placed as specified by the layout information; and a correlating unit that correlates the extracted additional information with the electronic document corresponding to the identification information associated with the electronic document, wherein the correlating unit determines a position of the additional information to be displayed together with the electronic document, based on positional relationships between the electronic document and the additional information entered in the entry area.

11. The document processing apparatus of claim 10, wherein the layout information is stored in the document storing unit.

12. The document processing apparatus of claim 10, wherein the additional information comprises information added to the electronic document after the electronic document is outputted from the document storing unit, and the additional information is entered in the entry area by a user by handwriting, printing by a printing device, or imprinting by a stamp.

13. The document processing apparatus of claim 10, wherein the image data reading unit obtains previously presented image data by reading, with the image data reading unit, a document of a predetermined format in which the electronic document, the identification information, the additional information previously correlated with the electronic document, and another entry area for second additional information are arranged, the information extracting unit extracts entered second additional information from the other entry area of the obtained previously presented image data, and the document processing apparatus further comprises:

a controller which determines whether to correlate the extracted second additional information with the additional information previously correlated with the electronic document.

14. The document processing apparatus of claim 13, wherein the controller determines whether to correlate the extracted second additional information with the previously correlated additional information by determining whether a selection area in the document of the predetermined format is selected, the correlating unit correlates, in response to the controller determining that the selection area is selected, the extracted second additional information with the additional information previously correlated with the electronic document and the controller stores the correlated second additional information in memory, and the controller stores, in response to determining that the selection area is not selected, the extracted second additional information in memory without correlating the second additional information with the additional information previously correlated with the electronic document.

15. The document processing apparatus of claim 10, further comprising:

a display unit which displays on a display the electronic document together with the entered additional information based on the correlation between the extracted additional information and the electronic document, wherein the entered additional information overlaps the electronic document and extends beyond a margin of the electronic document on the display.

16. A document processing system comprising:

a printing unit that prints one or more documents having a first format specifying layout information of a position where an electronic document is placed, a position where identification information identifying the electronic document is placed, and a position where an entry area for entering additional information is placed, wherein the electronic document is stored in a document storing unit and the electronic document is associated with the identification information identifying the electronic document;

an image reading unit that reads a document to obtain image data, wherein the document is printed by the printing unit;

a determination unit that determines whether the obtained image data is in the first format;

an information extracting unit that extracts, if it is determined that the obtained image data is in the first format, entered additional information from the entry area of the obtained image data based on the position where the entry area is placed as specified by the layout information; and a correlating unit that correlates the extracted additional information with the electronic document corresponding to the identification information associated with the electronic document, wherein the correlating unit determines a position of the additional information to be displayed together with the electronic document, based on positional relationships between the electronic document and the additional information entered in the entry area.

17. The document processing system of claim 16, wherein the layout information is stored in the document storing unit.

18. The document processing system of claim 16, wherein the additional information comprises information added to the electronic document after the electronic document is printed by the printing unit, and the additional information is entered in the entry area by a user by handwriting, printing by a printing device, or imprinting by a stamp.

19. The document processing system of claim 16, wherein the image reading unit obtains previously presented image data by reading, with the image reading unit, a document of a predetermined format in which the electronic document, the identification information, the additional information previously correlated with the electronic document, and another entry area for second additional information are arranged, the information extracting unit extracts entered second additional information from the other entry area of the obtained previously presented image data, and the document processing system further comprises:

a controller which determines whether to correlate the extracted second additional information with the additional information previously correlated with the electronic document.

20. The document processing system of claim 19, wherein the controller determines whether to correlate the extracted second additional information with the previously correlated additional information by determining whether a selection area in the document of the predetermined format is selected, the correlating unit correlates, in response to the controller determining that the selection area is selected, the extracted second additional information with the additional information previously correlated with the electronic document and the controller stores the correlated second additional information in memory, and the controller stores, in response to determining that the selection area is not selected, the extracted second additional information in memory without correlating the second additional information with the additional information previously correlated with the electronic document.

21. The document processing system of claim 16, further comprising:
a display unit which displays on a display the electronic document together with the entered additional information based on the correlation between the extracted additional information and the electronic document, wherein the entered additional information overlaps the electronic document and extends beyond a margin of the electronic document on the display.

22. A document processing method comprising:
reading, with an image reading apparatus, a document to obtain image data;
determining whether the obtained image data is in a first format, the first format specifying layout information of a position where an electronic document is placed, a position where identification information identifying the electronic document is placed, and a position where an entry area for additional information is placed, wherein the electronic document is stored in a storage portion and the electronic document is associated with the identification information identifying the electronic document;
if it is determined that the obtained image data is in the first format, extracting, based on the position where the entry area is placed as specified by the layout information, entered additional information from the entry area of the obtained image data; and
correlating the extracted additional information with the electronic document corresponding to the identification information associated with the electronic document, wherein the correlating determines a position of the additional information to be displayed together with the electronic document, based on positional relationships between the electronic document and the additional information entered in the entry area.

23. The document processing method of claim 22, wherein the layout information is stored in the storage portion.

24. The document processing method of claim 22, wherein the additional information comprises information added to the electronic document after the electronic document is outputted from the storage portion, and the additional information is entered in the entry area by a user by handwriting, printing by a printing device, or imprinting by a stamp.

25. The document processing method of claim 22, further comprising:
obtaining previously presented image data by reading, with the image reading apparatus, a document of a predetermined format in which the electronic document, the identification information, the additional information previously correlated with the electronic document, and another entry area for second additional information are arranged;
extracting entered second additional information from the other entry area of the obtained previously presented image data; and
determining whether to correlate the extracted second additional information with the additional information previously correlated with the electronic document.

26. The document processing method of claim 25, wherein the determining whether to correlate the extracted second additional information with the additional information previously correlated with the electronic document comprises:
determining whether a selection area in the document of the predetermined format is selected;
correlating, in response to determining that the selection area is selected, the extracted second additional information with the additional information previously correlated with the electronic document and storing the correlated second additional information; and
storing, in response to determining that the selection area is not selected, the extracted second additional information without correlating the second additional information with the additional information previously correlated with the electronic document.

27. The document processing method of claim 22, further comprising:
displaying, on a display, the electronic document together with the entered additional information based on the correlating between the extracted additional information and the electronic document, wherein the entered additional information overlaps the electronic document and extends beyond a margin of the electronic document on the display.

* * * * *